United States Patent [19]

Koller

[11] Patent Number: 5,728,297
[45] Date of Patent: Mar. 17, 1998

[54] APPARATUS FOR THE MECHANICAL CLEANING OF LIQUIDS

[76] Inventor: Josef Koller, Zeigeleiweg 26, D-40699 Erkrath, Germany

[21] Appl. No.: 594,004

[22] Filed: Jan. 30, 1996

[30] Foreign Application Priority Data

Jan. 30, 1995 [DE] Germany .............. 195 02 800.7

[51] Int. Cl.⁶ .............. B01D 29/68; B01D 35/02
[52] U.S. Cl. .............. 210/407; 210/408; 210/411; 210/415; 210/497.3
[58] Field of Search .............. 210/415, 333.1, 210/393, 413, 414, 408, 411, 448, 497.3, 391, 407

[56] References Cited

U.S. PATENT DOCUMENTS

| | | |
|---|---|---|
| 2,066,479 | 1/1937 | MacIsaac . |
| 3,256,995 | 6/1966 | Schmid . |
| 3,635,348 | 1/1972 | Carr . |
| 4,315,820 | 2/1982 | Mann . |
| 4,582,603 | 4/1986 | Nasse . |
| 4,849,105 | 7/1989 | Borchert . |
| 4,867,879 | 9/1989 | Muller . |
| 4,904,397 | 2/1990 | Eimer . |
| 5,275,728 | 1/1994 | Koller . |

FOREIGN PATENT DOCUMENTS

| | | |
|---|---|---|
| 605103 | 8/1931 | Germany . |
| 3829360 | 3/1990 | Germany . |
| 3000106 | 1/1991 | Japan . |

*Primary Examiner*—Thomas M. Lithgow
*Attorney, Agent, or Firm*—Sprung Horn Kramer & Woods

[57] ABSTRACT

An apparatus for the mechanical cleaning of liquids, especially cooling water delivered from a heat exchanger and flowing in a pipeline (10), with a rotationally symmetrical, conical sieve (12) of substantially the size of the pipe diameter, as well as a coaxial suction device (20) which is disposed on the upstream side of the sieve, is mounted for rotation continuously or with interruptions for the duration of a cleaning interval, and during the cleaning interval sucks bit by bit the entire surface of the sieve (12) on the upstream side, the sieve (12) being divided into areas, the intake nozzle (22) of the suction device (20) can cover each area, and in each area of the actual sieve surface and of the suction device there is a cavity for the temporary accommodation of contaminants, the sieve (12) being divided on its upstream side by substantially radial barriers (36) into individual sectors forming the areas, the intake nozzle (22) of the suction device (20) has such a shape that, at the moment in which the intake nozzle just covers one sector, and leaves adjacent sectors substantially free, the gap between the free barrier edges and the edges of the intake nozzle (22) of the suction device (20) is spanned by flexible sealing lips (44) of at least the height of the gap. Preferably the apex (61) of the cone has no barriers (36) and the ends of the barriers (36) disposed in the remaining area have no terminations, so that funnel-shaped chutes (63) result which are open on the upstream and downstream ends, so that hard contaminants, such as stones, mussels, will slide along the sieve surface (64) into the barrier-free cone apex (61) and are there sucked away from the opening (62) present in the coupling tube (24).

8 Claims, 4 Drawing Sheets

APPARATUS FOR THE MECHANICAL CLEANING OF LIQUIDS

BACKGROUND OF THE INVENTION

The invention relates to an apparatus for the mechanical cleaning of liquids, especially cooling water coming from a heat exchanger, which flow in a pipeline, which is provided with a rotationally symmetrical, conical sieve substantially of the size of the pipeline diameter, as well as with a coaxial suction device disposed on the upstream side of the sieve and rotatably mounted, which can be driven continuously or with interruptions for the duration of a cleaning interval, and is provided with an intake nozzle, and gradually during the cleaning interval sucks the entire surface of the sieve on the upstream side, the sieve being divided into areas, the intake nozzle of the suction apparatus being able to cover each area, and in each area of the actual sieve surface and of the suction device a chamber is present for the temporary accommodation of contaminants, the sieve body being divided on the upstream side by substantially radial barriers forming the chamber into individual sectors forming the areas, the intake nozzle of the suction device having such a shape that, at the moment in which the intake nozzle just covers a sector, it leaves adjacent sectors substantially free, and the gap between the free barrier edges and the edges of the intake nozzle of the suction device is spanned by flexible sealing lips of at least the height of the gap.

An apparatus of this kind is already disclosed in EP 0 268 752 B 1.

It is advantageous in cooling water filters to achieve a great storage capacity for deposited dirt, so that in the event of an abrupt great occurrence of dirt the sieve will not be overloaded mechanically, and the stream of cooling water to the condenser will not be greatly reduced much less interrupted. Such an interruption in the operation of engines is intolerable.

A relatively great dirt capacity is achieved with a conical sieve, such as the one represented in FIG. 6 of the European patent. The truncation of this conical sieve reduces the total achievable sieve area. The sieve area can of course be increased by making the truncated cone taper more acutely, but then the segments in the cone apex become so narrow that coarse contaminants such as wood, stones, or mussels, can become clenched between the barriers and then can no longer be sucked out. On the other hand, for technical reasons relating to engines, the segments, and with them the rate of suction of the water, cannot be selected arbitrarily, because the water that is sucked out would be lost to the cooling process.

BRIEF DESCRIPTION OF THE INVENTION

The invention is addressed to the problem of configuring the known apparatus such that these disadvantages are avoided. The problem is solved by the fact that the cone apex does not have barriers, and the ends of the barriers in the rest of the area are not joined to any obstruction, so that funnel-like chutes result, which are open at the upstream and downstream end, so that hard contaminants such as stones or mussels will slide along the sieve surface into the barrier-free cone apex and will be sucked away there from the opening present in the suction rotor.

DETAILED DESCRIPTION OF THE INVENTION

One advantageous embodiment consists in having no sieve openings in the area of the barrier-free apex of the conical sieve body. This results in an improved removal of the contaminants that have collected in the apex. The collection of the hard contaminants in the apex leaves the sieve body clean for a longer time, so that the flushing intervals can be prolonged and water will not be wasted.

It is furthermore advantageous to configure the flexible seal as a flexible hollow body, preferably a tubular seal, supporting it additionally with plates. Sealing with a tubular seal has the advantage that production inaccuracies can be better compensated while providing greater stiffness against the suction that occurs.

The system according to the invention makes it possible to make a conical sieve in a comparatively acute shape, so that the loss of sieve area due to the truncation of the cone remains relatively small.

The conical configuration of the sieve has considerable cost advantages over all other configurations. This shape is simple to manufacture, even with a great sieve area, and can withstand the forces of pressure and flow without additional, costly supporting designs such as those described in the state of the art. Since cooling water filters are used mostly for sea-water cooling, highly corrosion resistant, expensive metals must be used. The elimination of the supporting structure, which the state of the art considers necessary, reduces the cost of materials and manufacture by at least 50%.

The arrangement according to the invention, despite the relatively acute conical shape, also prevents the suction nozzle from becoming clogged by the gathering of stones, wood, mussels etc., so that the sieve surface can no longer be cleaned. This danger still exists in the state of the art, since this second application of suction for the sieve bottom is lacking.

Usually the barriers will be arranged so that the prolongation of their longitudinal axes pass through the axis of symmetry of the sieve, but an arrangement is also possible in which the center points of the central angle lie outside of this axis of symmetry, for example on a circle arranged around this axis of symmetry.

BRIEF DESCRIPTION OF THE DRAWINGS

The invention will be further explained with the aid of embodiments which are represented in the drawings.

DETAILED DESCRIPTION OF THE INVENTION

Figure 1:
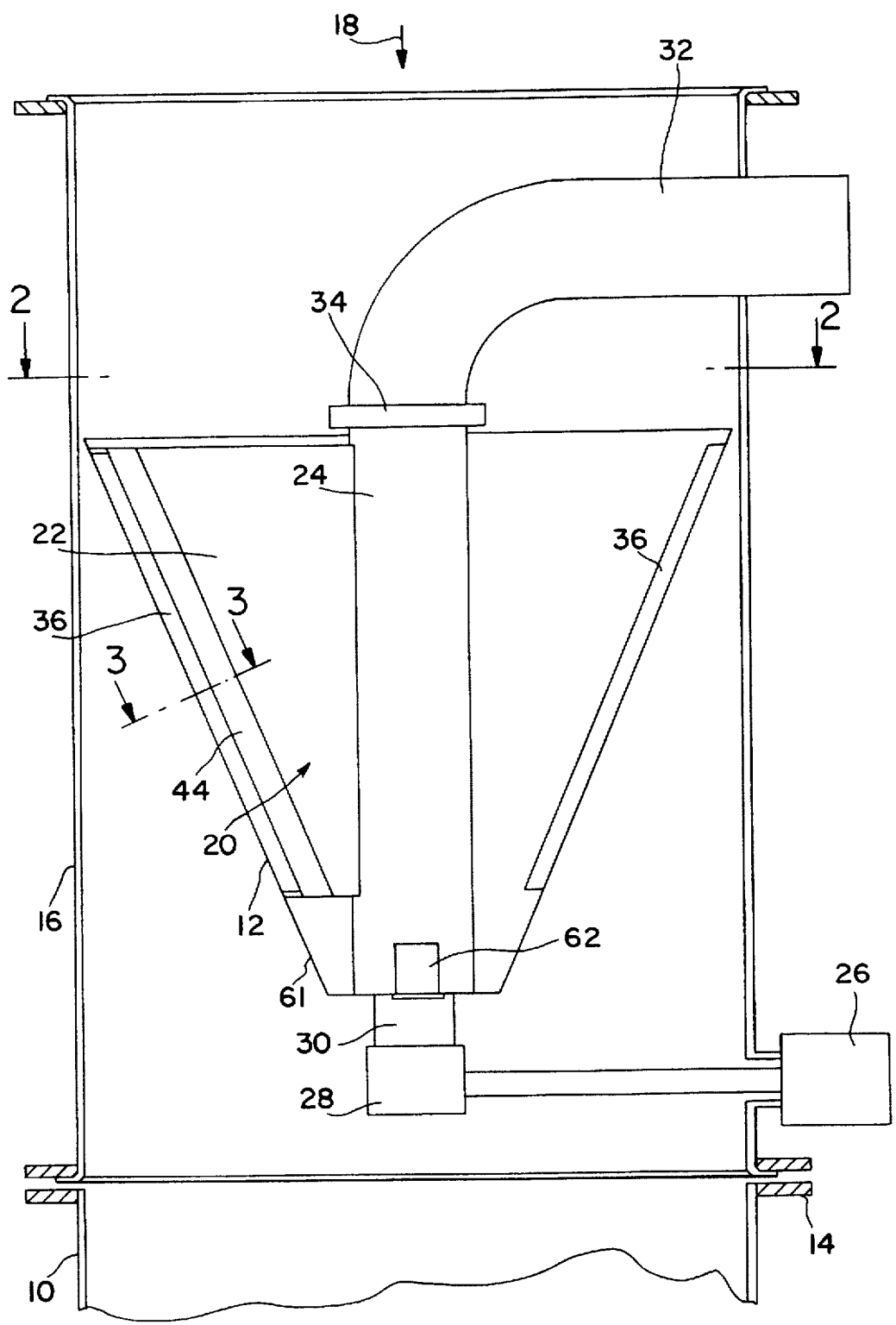
FIG. 1 shows an axial section of the basic form of an apparatus.

In FIG. 1 there can be seen a cooling water supply line 10 which preferably runs to a heat exchanger or to a condenser of an engine; also seen is a conical sieve 12 which is disposed within a pipe section 16 attached to the flange 14 of the cooling water supply line 10. The cooling water flows through the pipe section 16 and then through the cooling water supply line 10 in the direction of the arrow 18. On the upstream side of the sieve 12 can be seen a suction device 20 with a suction nozzle 22 opposite the sieve 12; the nozzle is connected to a coupling tube 24 coaxial with the pipe line 10 and pipe section 16, and it is driven in rotation through a drive shaft 30 either directly or via a gear box 28 with a motor disposed outside of the pipe section 16. The rotatable coupling tube 24 is followed by a stationary pipe elbow 32 which passes radially out through the wall of the pipe section 16 and is connected, through a valve not shown here, to a suction line not further represented.

Figure 2:
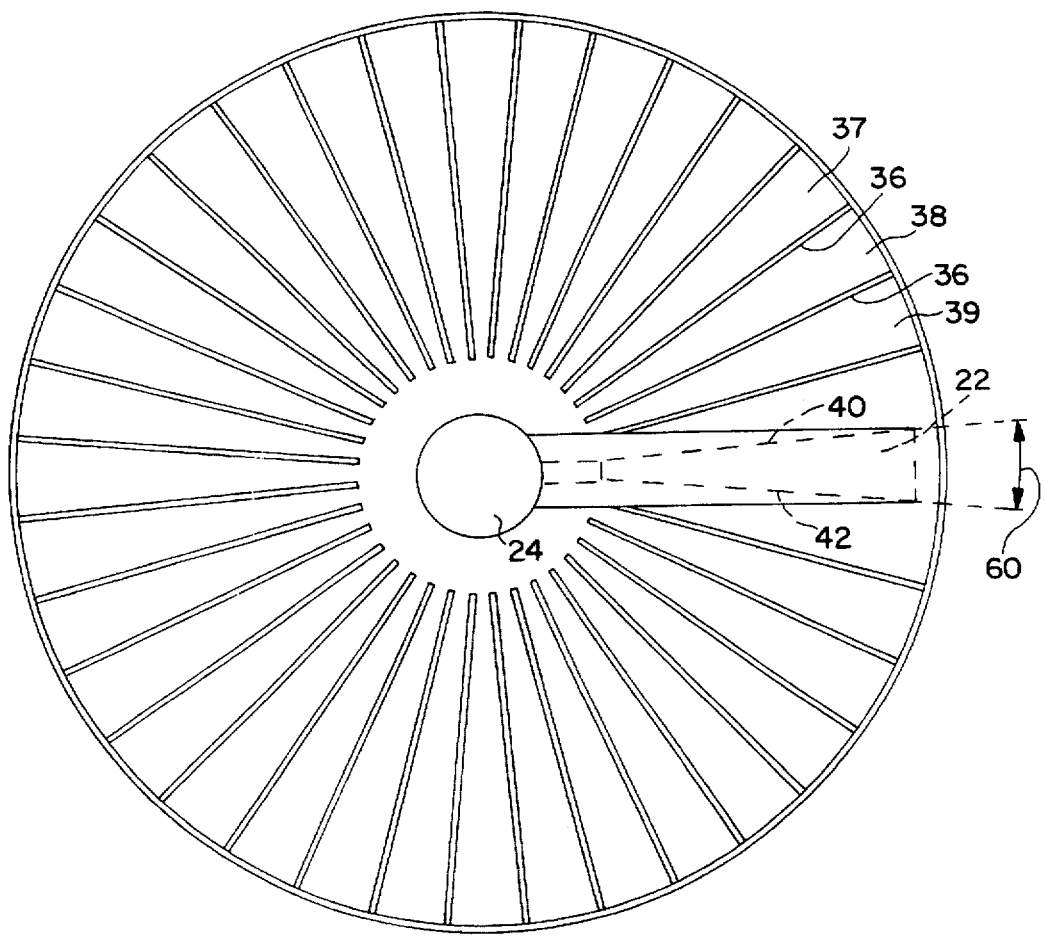
FIG. 2 a view along section line 2—2 of FIG. 1.

Pipe elbow 32 and coupling tube 24 are connected by a swivel coupling 34 permitting rotation against one another but not further explained. As it appears, for example, from the top view of the sieve 12 (view 2—2 of FIG. 1, corresponding also to FIG. 2) and FIG. 3, a section along section line 3—3 of FIG. 1, and an enlarged detail of the sieve, radial barriers 36 are provided on the upstream side of the sieve 12, running contrary to the direction of flow (arrow 18 in FIG. 1), which divide the sieve surface 12 into individual areas of equal size 37, 38, 39, according to FIG. 2. A suction nozzle 22 is formed in the same manner as the areas 37, 38 and 39, the two radial lateral walls 40 and 42 of the nozzle 22 here form the same center angle 60 with one another as the barriers 36 forming the areas 37, 38 and 39.

Figure 3:
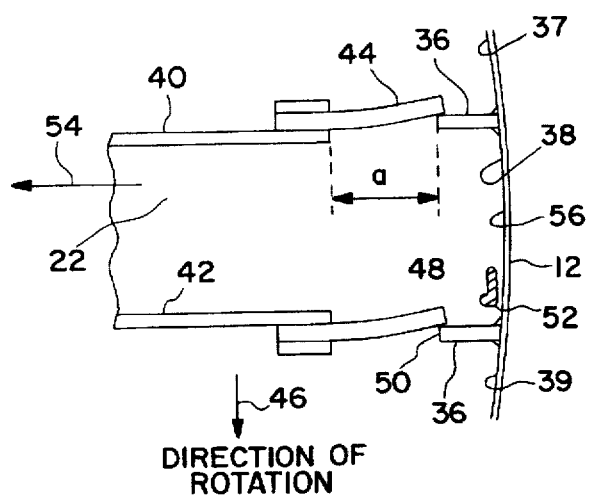
FIG. 3 a sectional view along section line 3—3 of FIG. 1 to explain an improved embodiment.

FIG. 3 shows that the ends of the radial lateral walls 40 and 42 of the suction nozzle 22 are spaced apart from the barriers 36 and thus leave open a gap a. This gap a is spanned, in the embodiment represented in FIG. 3, by flexible lips 44 which are fastened in any appropriate manner to the ends of the walls 40, 42, these lips in this embodiment being slightly longer than corresponds to the gap width a, so that, in the direction of rotation represented by arrow 46, the free ends of the lips 44 laterally make contact with the barriers 36, flex away elastically upon further movement in the direction of arrow 46, as it can also be seen in FIG. 3, and upon still further movement in the direction of arrow 46 they are flexed so greatly away that their edges 48 can pass over the edge 50 of the barriers 36 and thus break free. In the period in which the lips 44 apply themselves to the barriers 36 and remain in contact with them, the suction nozzle 22 forms over the area 38 of the sieve 12 a space cut off from the flow in the adjacent areas 37 and 39.

On the upstream side of the sieve 12, contaminants deposited during the operating period, such as grass, leaves, plastic, even stones, mussels, wood residues and the like which are within the area 38, are, during this period of time, by the effect of the backflow 54 produced in the suction line 22, swept from the upstream side 56 of the sieve 12, back into the area 38 and from there into the suction nozzle 22, and finally from there through the connection 24 to the elbow 32 and into a trap, for example.

Due to the sealing off of the gap a by the lip 44 (and corresponding lips on walls running transversely, if provided, but not shown here), the leakage paths reducing the force of the flow are cut off.

The operation of the suction system 20 disposed on the upstream side of the sieve 12 can be either continuous—in which case a back flow of brief duration takes place while the sealing lips 24 are in contact with the barriers 36—or it can be interrupted, for example in order to start up the individual areas cyclically and clean off the sieve with special intensity by means of especially long back-flushing procedures.

After one complete rotation over 360°, it is thus possible to draw off the entire surface of the upstream side of the sieve 12. The direction of rotation can be reversed, with the benefit of more even stress and wear on the sealing lips.

Due to their height projecting above the surface 56 of the sieve the barriers 36 create space to accommodate deposited material 52, so that, if desired, the cleaning procedure will not become necessary until after a greater period of time, during which the sector can fill with waste material. This time period depends upon the height of the barriers 36 and on the acceptable amount of deposited material, which increases resistance to flow.

It will be clear that, especially when no great amount of contaminants occur, or when cyclical operation is intended, the sealing lips 48 need to be no longer than corresponds to the dimension of gap a, i.e., that then they do not come in contact with the barriers 36.

Figure 4:
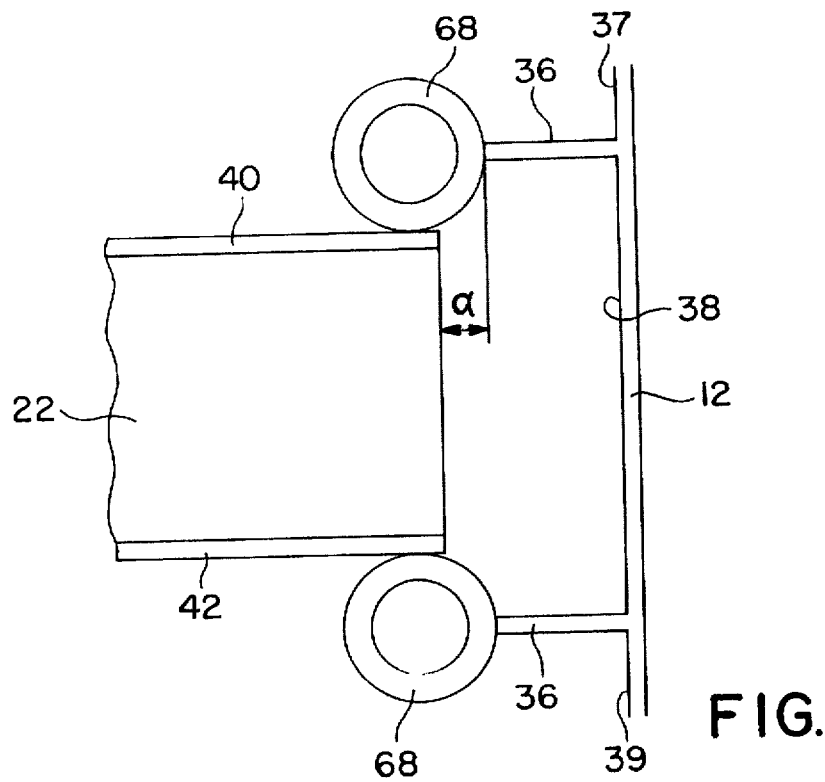
FIG. 4 a sectional view along section line 3—3 of FIG. 1 to explain an additional improved embodiment.
Figure 5:
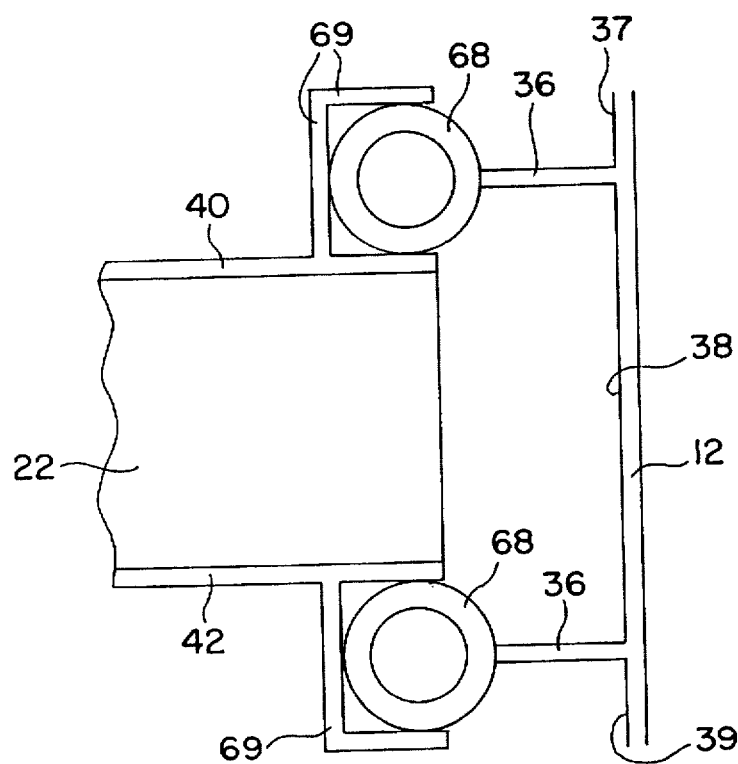
FIG. 5 a sectional view along section line 3—3 of FIG. 1 to explain an additional improved embodiment.

In FIGS. 4 and 5 there is represented the flexible sealing means in the form of a flexible hollow body, preferably a tube 68, fastened to the walls 40 and 42; additional supporting means 69 can also be provided.

Figure 6:
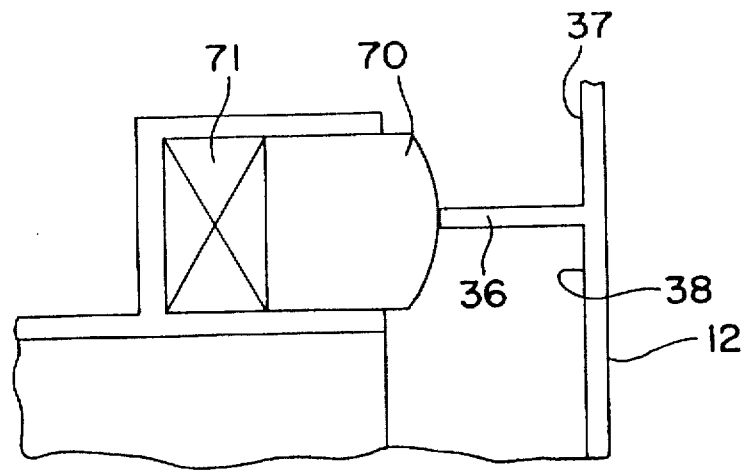
FIG. 6 a sectional view along section line 3—3 of FIG. 1 to explain an additional improved embodiment.

In FIG. 6, the flexible sealing means is constituted by a seal profile 70 with a convex edge or with a surface sloping against the barrier 36. An elastic means 71 produces the necessary sealing force.

Figure 7:
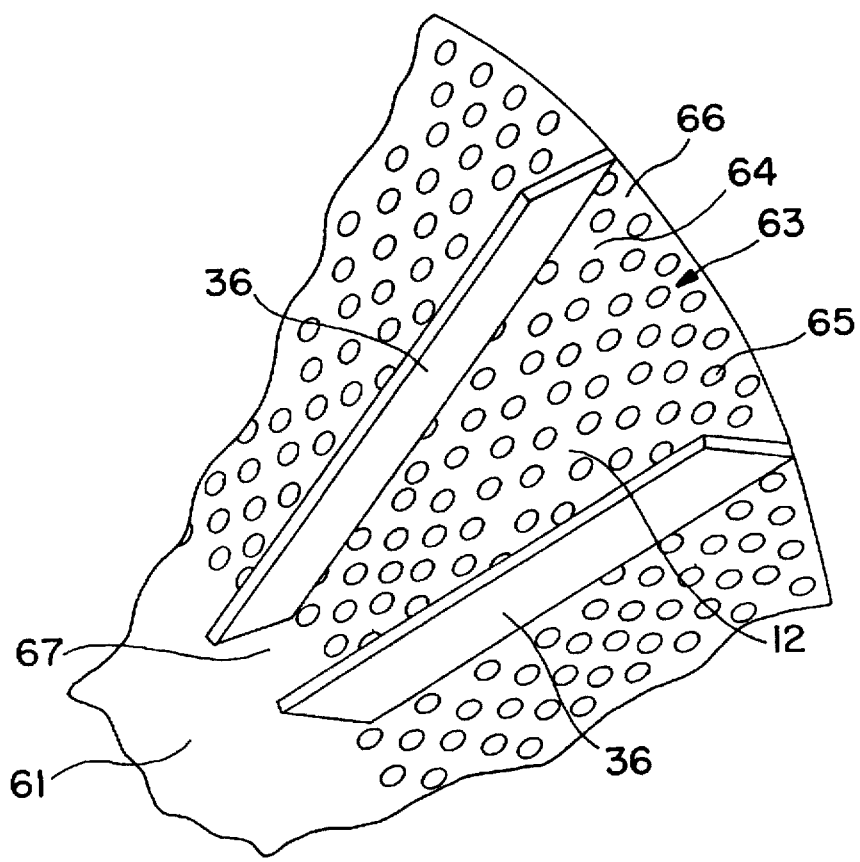
FIG. 7 a perspective representation of the chute.

FIG. 7 shows a chute 63 with sieves 12 and barriers 36, with an entry area 66 and an exit area 67.

It will be understood that the specification and examples are illustrative but not limitative of the present invention and that other embodiments within the spirit and scope of the invention will suggest themselves to those skilled in the art.

I claim:

1. An apparatus for the mechanical cleaning of liquids in a cooling water feeding pipe, comprising a rotationally symmetric conical sieve body disposed in and extending over substantially the entire cross-section of a cooling water feeding pipe, said conical sieve having a concave side and a convex side, the concave side facing upstream, with respect to the direction of flow, and the convex side facing downstream with respect to the direction of flow, the apex of said conical sieve being truncated, whereby water flowing in said feeding pipe enters the concave side of said conical sieve and exits the convex side of said sieve, the surface of said concave side of said conical sieve being divided by substantially radial barriers projecting therefrom but spaced a predetermined distance apart from the surface of the truncated apex, so that the surface of said concave side of said sieve immediately adjacent the truncated apex is without said barriers, said barriers forming chambers with said surface of said concave side of said sieve, and subdividing said concave side into individual sectors, said apparatus further comprising a rotatable suction device coaxial with said conical sieve body, means for rotating said suction device for partially acting upon and completely successively sweeping said surface of said concave side of said sieve, said suction device having an intake nozzle which has substantially the same shape as the individual sectors of said surface of said concave side of said sieve, said nozzle being spaced apart from said radial barriers thereby forming a gap between said nozzle and said barriers, said suction nozzle being provided with flexible sealing lips which extend from the nozzle in the direction of said barriers a distance at least equal to the distance of said gap, said suction device being connected to a coupling tube coaxial to said conical sieve body, said coupling tube extending at one end to the truncated apex of said conical sieve and the opposite end of said coupling tube being rotatably connected to a suction pipe, which provides suction through said coupling tube to said suction nozzle, said coupling tube having an opening in the area of the truncated nozzle bounded by that portion of the surface area of the concave side of said conical sieve adjacent to said truncated apex and apart from said barriers.

2. Apparatus according to claim 1, wherein the flexible sealing lips extend across the gap to such an extent that during the movement of the lips with respect to the barriers, they first contact the latter laterally, increasingly flex, and finally slide over the barrier edge in a bowed state.

3. Apparatus according to claim 1, wherein the flexible sealing lips are each configured as a flexible hollow body.

4. Apparatus according to claim 1, wherein each flexible sealing lip is a flexible tube.

5. Apparatus according to claim 4, wherein the flexible tube rests not only on the fastening walls but also on one or more additional surfaces.

6. Apparatus according to claim 1, wherein an entry area and an exit area of each chamber are covered by the intake nozzle.

7. Apparatus according to claim 1, wherein the conical sieve body has no sieve holes in the area of the barrier-free cone apex.

8. Apparatus according to claim 1, wherein each sealing lip covers the gap consists of a convexly shaped sealing profile and an elastic element guided by a mounting (73).

* * * * *